US010028439B2

(12) United States Patent
Van Bentzinger et al.

(10) Patent No.: US 10,028,439 B2
(45) Date of Patent: *Jul. 24, 2018

(54) APPARATUS FOR GATHERING BALES THAT INCLUDE A FORWARD-LOOKING SENSOR AND METHODS FOR GATHERING BALES USING SUCH APPARATUS

(71) Applicant: Vermeer Manufacturing Company, Pella, IA (US)

(72) Inventors: Rustin Van Bentzinger, Pella, IA (US); Kent Thompson, Otley, IA (US); Darin Dux, Pella, IA (US)

(73) Assignee: Vermeer Manufacturing Company, Pella, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/996,586

(22) Filed: Jan. 15, 2016

(65) Prior Publication Data

US 2016/0128279 A1 May 12, 2016

Related U.S. Application Data

(63) Continuation of application No. 13/918,250, filed on Jun. 14, 2013, now Pat. No. 9,271,446.

(Continued)

(51) Int. Cl.
*G06F 19/00* (2018.01)
*A01D 90/02* (2006.01)
(Continued)

(52) U.S. Cl.
CPC ............ *A01D 90/02* (2013.01); *A01B 69/001* (2013.01); *A01D 41/1278* (2013.01);
(Continued)

(58) Field of Classification Search
CPC .... A01D 90/083; A01D 90/08; A01D 85/005; B60P 1/38; Y10S 414/133
(Continued)

(56) References Cited

U.S. PATENT DOCUMENTS 2,367,970 A * 1/1945 Smoker ................ A01D 87/122
198/310
2,397,570 A * 4/1946 Smoker ................ A01D 87/122
198/310
(Continued)

FOREIGN PATENT DOCUMENTS

DE 19819600 A1 11/1999
EP 2160939 A1 3/2010
(Continued)

OTHER PUBLICATIONS

International Search Report, Application No. PCT/NL2013/050462, dated Apr. 28, 2014, pp. 4.
(Continued)

*Primary Examiner* — Gregory W Adams
(74) *Attorney, Agent, or Firm* — Armstrong Teasdale LLP

(57) ABSTRACT

Apparatus for gathering bales that include a forward-looking sensor to sense the bale are disclosed. The apparatus may also include a control system that is configured to alter a portion of the apparatus to lift the bale based on output from the forward-looking sensor. Methods for transferring bales that use such an apparatus are also provided.

25 Claims, 16 Drawing Sheets

Related U.S. Application Data

(60) Provisional application No. 61/665,757, filed on Jun. 28, 2012.

(51) Int. Cl.

| | |
|---|---|
| *A01B 69/00* | (2006.01) |
| *A01D 41/127* | (2006.01) |
| *E02F 3/84* | (2006.01) |
| *G05D 1/02* | (2006.01) |
| *A01D 90/08* | (2006.01) |
| *A01D 90/12* | (2006.01) |
| *B60P 1/38* | (2006.01) |

(52) U.S. Cl.
CPC ........... *A01D 90/083* (2013.01); *A01D 90/12* (2013.01); *E02F 3/841* (2013.01); *G05D 1/02* (2013.01); *B60P 1/38* (2013.01)

(58) Field of Classification Search
USPC ..... 172/5, 6; 198/300, 510.1, 512, 517, 518; 280/462, 463, 464, 465, 466; 348/118, 348/119, 120; 414/111, 24.5, 409, 481, 414/483, 486, 487, 488, 501, 502, 507, 414/523, 527, 529, 555; 56/10.2 D, 56/10.2 F, 14.9, 15.6; 700/114; 701/302, 701/514, 523; 702/150; 901/47
See application file for complete search history.

(56) References Cited

U.S. PATENT DOCUMENTS

| | | | | |
|---|---|---|---|---|
| 2,724,517 A | * | 11/1955 | Lewis | E21F 13/063 |
| | | | | 180/424 |
| 3,951,288 A | | 4/1976 | Hale et al. | |
| 3,952,895 A | | 4/1976 | Campbell | |
| 4,044,906 A | | 8/1977 | Schrag et al. | |
| 4,184,581 A | * | 1/1980 | Crawshay | B65G 65/04 |
| | | | | 198/301 |
| 4,248,561 A | | 2/1981 | Graves | |
| 4,249,850 A | * | 2/1981 | Van Doorn | A01D 87/121 |
| | | | | 198/301 |
| 4,287,692 A | * | 9/1981 | Alexander | E21C 35/02 |
| | | | | 198/517 |
| 4,295,323 A | | 10/1981 | Maier et al. | |
| 4,355,713 A | * | 10/1982 | Adam | A01D 87/127 |
| | | | | 198/514 |
| 4,396,330 A | | 8/1983 | Rozeboom | |
| 4,433,533 A | | 2/1984 | Giani | |
| 4,769,700 A | * | 9/1988 | Pryor | A01B 69/008 |
| | | | | 348/120 |
| 4,832,553 A | * | 5/1989 | Grey | A01D 90/08 |
| | | | | 198/512 |
| 4,868,796 A | * | 9/1989 | Ahrens | B65F 3/04 |
| | | | | 367/96 |
| 5,010,719 A | | 4/1991 | Korthuis | |
| 5,256,021 A | | 10/1993 | Wolf et al. | |
| 5,639,199 A | | 6/1997 | Connell, Jr. | |
| 5,829,238 A | | 11/1998 | Branson | |
| 5,851,100 A | | 12/1998 | Brandt | |
| 5,911,669 A | | 6/1999 | Stentz et al. | |
| 6,082,466 A | | 7/2000 | Gudat | |
| 6,101,795 A | | 8/2000 | Diekhans | |
| 6,247,538 B1 | * | 6/2001 | Takeda | E02F 3/842 |
| | | | | 172/2 |
| 6,704,619 B1 | | 3/2004 | Coleman et al. | |
| 6,997,663 B2 | | 2/2006 | Siebenga | |
| 7,404,355 B2 | | 7/2008 | Viaud et al. | |
| 7,887,275 B2 | | 2/2011 | Anderson | |
| 7,916,898 B2 | | 3/2011 | Anderson | |
| 9,271,446 B2 | * | 3/2016 | Van Bentzinger | A01D 90/02 |
| 2009/0214324 A1 | | 8/2009 | Grinnell et al. | |
| 2010/0063690 A1 | | 3/2010 | Madsen | |
| 2010/0299029 A1 | | 11/2010 | Fackler et al. | |
| 2011/0014022 A1 | | 1/2011 | Shoemaker et al. | |
| 2011/0318150 A1 | | 12/2011 | Kelderman | |
| 2012/0055759 A1 | * | 3/2012 | Horst | A01D 87/122 |
| | | | | 198/512 |

FOREIGN PATENT DOCUMENTS

| | | |
|---|---|---|
| WO | 2011023855 A1 | 3/2011 |
| WO | 2013034268 A1 | 3/2013 |

OTHER PUBLICATIONS

Co-Owned U.S. Appl. No. 13/918,262, filed Jun. 14, 2013, pp. 25.
Co-Owned U.S. Appl. No. 13/918,273, filed Jun. 14, 2013, pp. 24.
Co-Owned U.S. Appl. No. 13/918,286, filed Jun. 14, 2013, pp. 27.
Co-Owned U.S. Appl. No. 13/918,293, filed Jun. 14, 2013, pp. 19.

* cited by examiner

APPARATUS FOR GATHERING BALES THAT INCLUDE A FORWARD-LOOKING SENSOR AND METHODS FOR GATHERING BALES USING SUCH APPARATUS

CROSS-REFERENCE TO RELATED APPLICATION

The present application is a continuation of U.S. patent application Ser. No. 13/918,250, filed Jun. 14, 2013, now U.S. Pat. No. 9,271,446, which claims the benefit of U.S. Provisional Patent Application No. 61/665,757, filed Jun. 28, 2012, both of which are incorporated herein by reference in their entirety.

FIELD OF THE DISCLOSURE

The field of this disclosure relates to apparatus for gathering bales that include a forward-looking sensor and to methods for transferring bales that use such an apparatus.

BACKGROUND

Crop forages such as hay (e.g., alfalfa and/or grass hay) are periodically cut in the field, dried and compacted into bales for transport and storage of the forage material. Recent improvements in row crop production and in technology for processing these materials have led to changes in the scale and economics of harvest and to increasing potential for harvest of crop residues like corn stover. Corn stover is also baled in the field and used as livestock feed, bedding or production of biofuels. In addition, harvest technology for cotton has been developed, that includes the step of baling the cotton in the field. Due to these relatively recent changes, the scale at which this type of harvest process is conducted in some instances is different than the traditional process. The density of the bales, in terms of the number of bales per acre, is higher in some instances, the labor availability is less in some instances and the criticality of timing is higher in some instances.

Materials may be baled into relatively large round, rectangular or square (in cross-section) bales which may be tied by twine, netting or plastic wrap depending on the type of material, the type of storage and the intended use of the material. The bales are typically left in the field, near the location where the bale was formed, to minimize labor and time required for the harvest process including the baling operation.

A continuing need exists for an apparatus for gathering and transporting bales in the field after baling, one that allows the bales to be gathered relatively quickly and reliably and in a way to minimize demands on the operator, and that consistently positions the bales adjacent one another to minimize the area required for storage. A need also exists for methods for gathering bales that use such apparatus.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect of the present disclosure, an apparatus for gathering bales includes a chassis. A forward-looking sensor is mounted on the chassis for sensing a bale. The apparatus includes a controller for adjusting the position of the apparatus based on signals from the sensor.

Another aspect of the present disclosure is directed to a method for gathering bales resting on a surface by use of an apparatus for gathering bales. The apparatus is guided toward a bale. A bale is sensed and the position of the apparatus is adjusted in response to sensing the bale.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
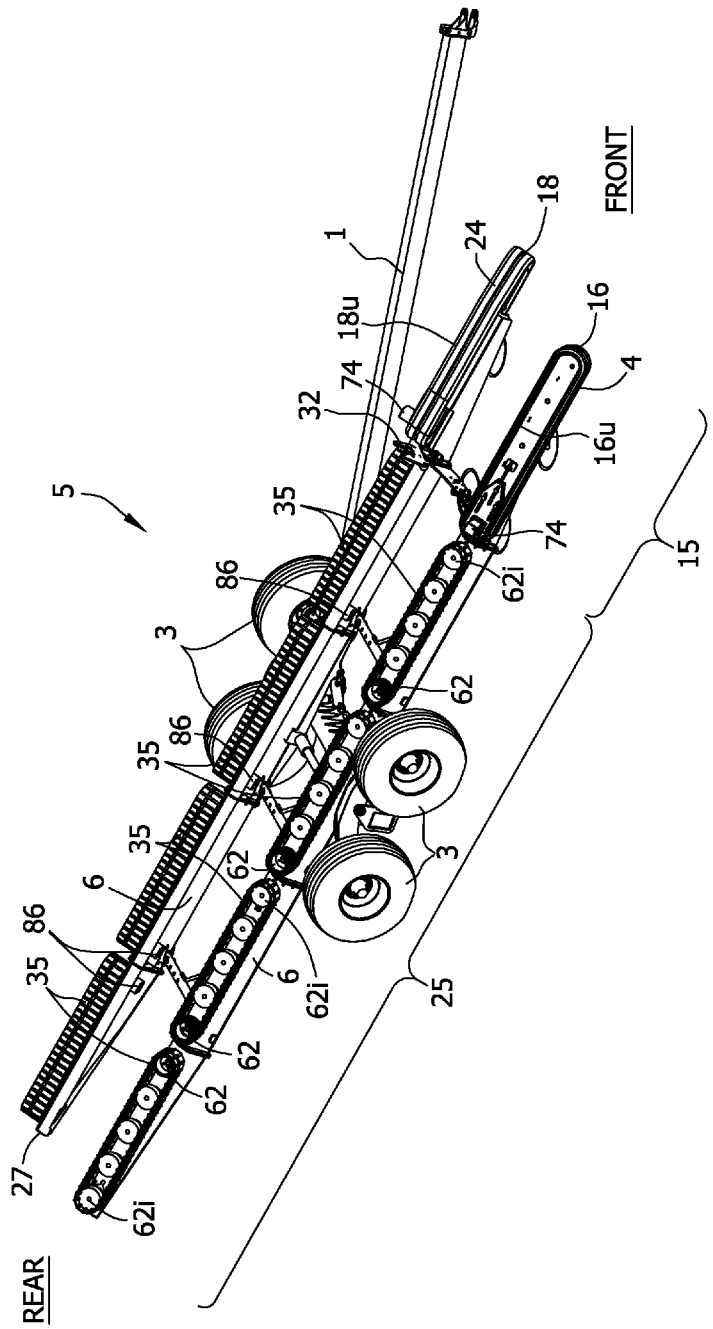
FIG. 1 is a perspective view of an apparatus for gathering bales.
Figure 10:
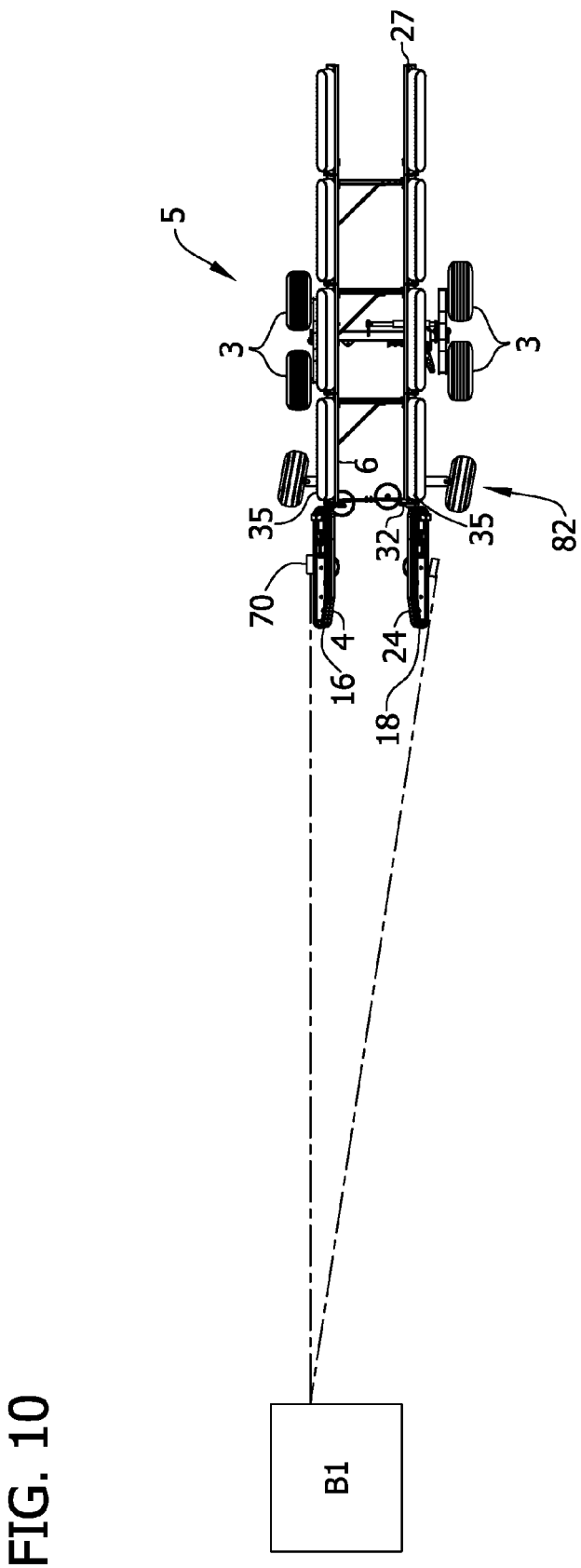
FIG. 10 is a top view of another embodiment of the apparatus that is self-propelled in the traveling position.

An embodiment of an apparatus for gathering bales is generally referred to as 5 in FIG. 1. The apparatus 5 includes a bed 25 for holding one or more bales and a loading assembly 15 for lifting a bale off the ground and conveying it to the bed. The apparatus 5 includes a tongue 1 for pulling the apparatus by use of for example, a tractor or other pulling vehicle. In some embodiments and as shown in FIG. 10 the apparatus 5 includes its own propulsion mechanism (i.e., powered front wheels) rather than being pulled by a pulling vehicle. The apparatus may be guided toward bales by a user or may be partially or fully guided by a global positioning system (GPS).

Generally, the apparatus 5 is suitable for picking up cylindrical bales commonly referred to as "round" bales. Round bales are used for harvesting any material capable of being formed into a cylindrical bale such as traditional hay crops (e.g., alfalfa or grass), corn stover or other crop residues, cotton, or wood products like small diameter trees. The apparatus 5 shown in FIG. 1 is configured for loading up to five bales. The apparatus 5 may be modified to carry more or less bales without departing from the scope of the present disclosure. The apparatus may be modified to carry square or rectangular bales, or any compacted form of crop material, without departing from the scope of the present disclosure.

Figure 14:
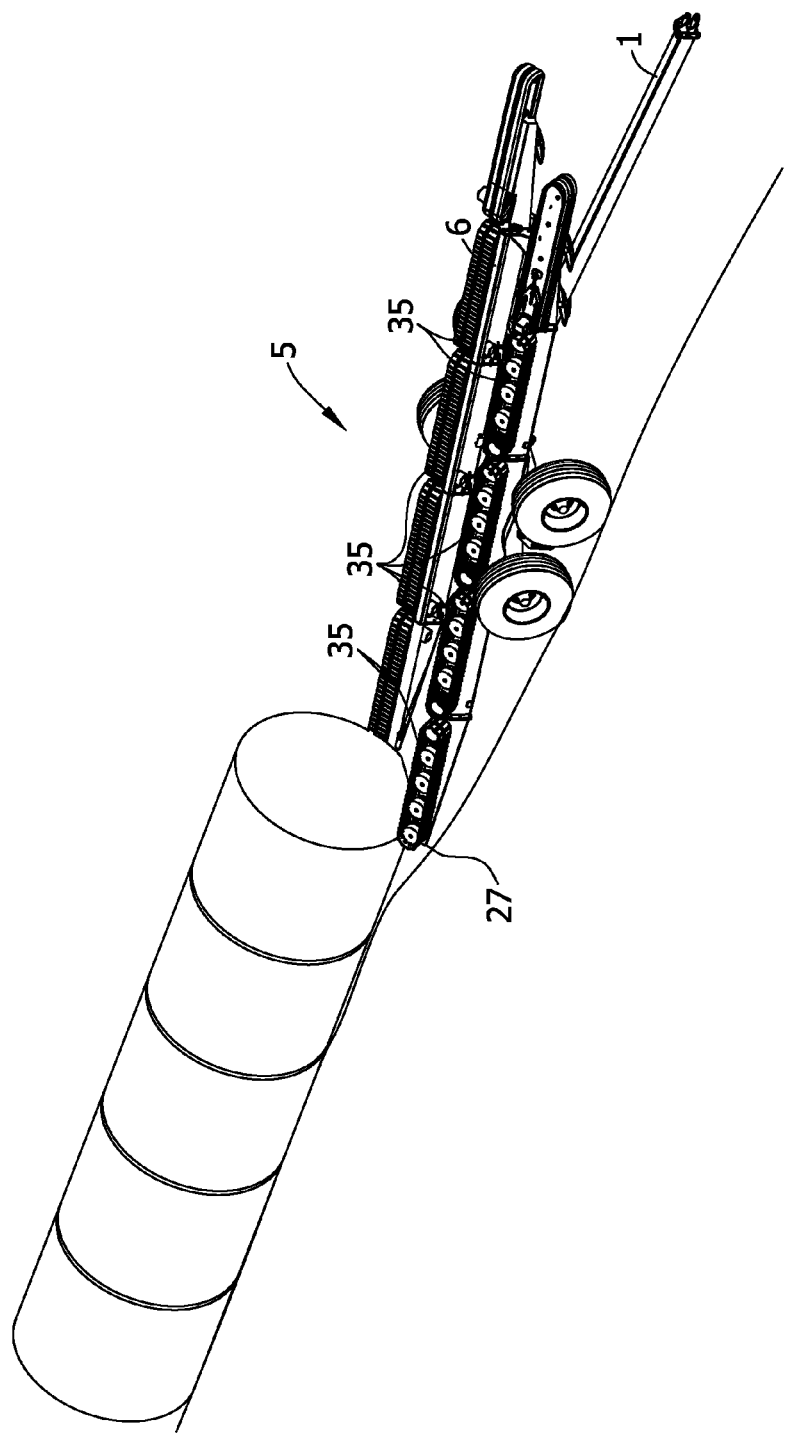
FIG. 14 is a perspective view of the apparatus during unloading of bales.

The apparatus 5 includes wheels 3 attached to a bed chassis 6. The bed 25 tilts between various positions, to a forward tilted position for loading the bales or unloading to the front, to a middle position used after bales have been loaded for transportation of the loaded bales (FIG. 5) and to a rearward tilted position for unloading and re-loading of bales to the rear (FIG. 14). The apparatus 5 may be tilted hydraulically through manual or automatic control by use of a hydraulic cylinder 17 (FIG. 2) or by any other method available to those of skill in the art. Tracks (not shown) may be used as an alternative to the wheels 3.

Figure 15:
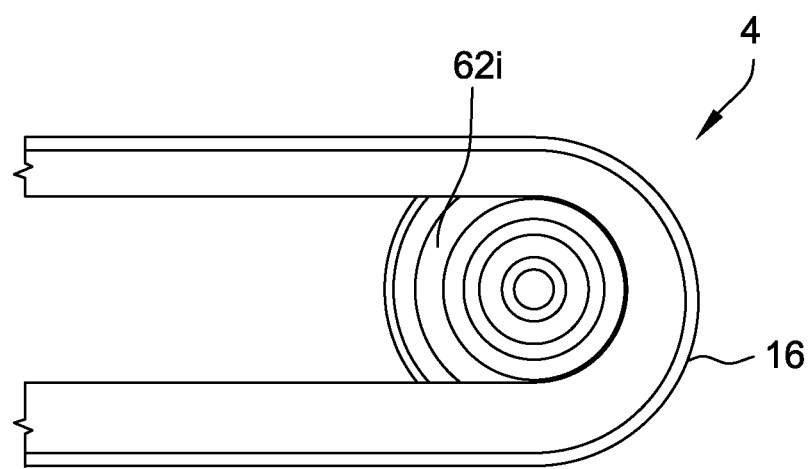
FIG. 15 is a cross-sectional view of a first arm of a loading assembly.
Figure 16:
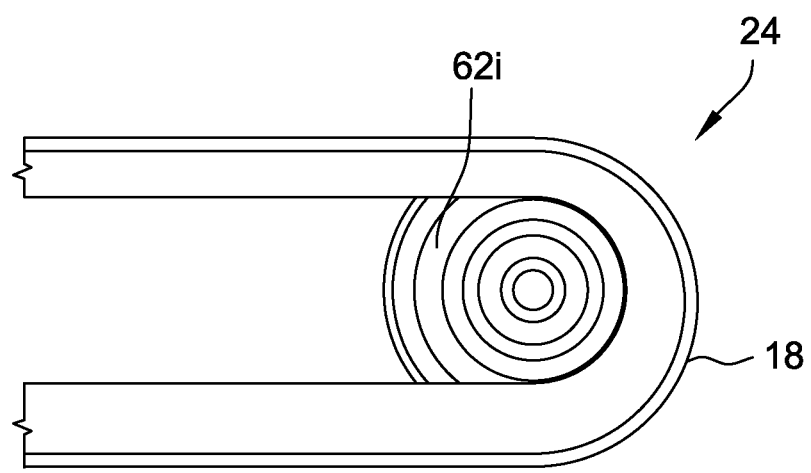
FIG. 16 is a cross-sectional view of a second arm of the loading assembly.

The loading assembly 15 includes two arms 4, 24 that are the first portion of the apparatus 5 to contact the bale during loading. Each arm 4, 24 includes an endless conveyor belt 16, 18. The endless conveyor belts 16, 18 may include various drive, idler and/or support rollers (e.g., idler rollers 62i as shown in FIGS. 15 and 16) for rotating the conveyor belt. In some cases the drive roller is positioned at the front, and in some cases at the rear.

Each belt 16, 18 includes upper portions 16u, 18u (FIG. 1) that are capable of carrying the weight of a bale. The movement of the belt, around the front roller and backward along the upper portion of the belt path, has been found to be effective to lift a bale off the ground and for simultaneously causing the bale to move toward the bed 25. This lifting and transporting action occurs after the two conveyor belts contact the bale.

Referring again to FIG. 1, the bed 25 includes a number of bed conveyors 35, each having an endless belt routed around a front idler roller and a rear powered roller that may be rotated to cause the belt to move which results in moving bales away from the loading assembly and toward the end 27 of the bed. Each conveyor 35 may have an effective length, the distance between the idler roller and the drive roller. This effective length may be the length of about one bale. Typical bale lengths for forage products may be between about 40 and 60 inches and bales of cotton are in the range of 100 inches in length. It should be noted that the apparatus 5 and the effective length of the conveyor belts 16, 18 and bed conveyors 35 are not limited by bale size or to a particular length.

Alternatively, the bed 25 may have one bed conveyor 35 on each side (not shown) that extends from the first end 32 to the second end 27 rather than a series of bed conveyors on each side. In some embodiments, the bed 25 has a single conveyor belt (not shown) that forms a floor of the bed upon which the bales rest for moving bales toward the second end 27.

The conveyor belts 16, 18 of the first and second arms 4, 24 of the loading assembly 15 and the conveyor belts 35 of the bed 25 may be driven by hydraulics, as discussed above, or alternately by any type of rotary power device such as an electric motor.

Figure 11:
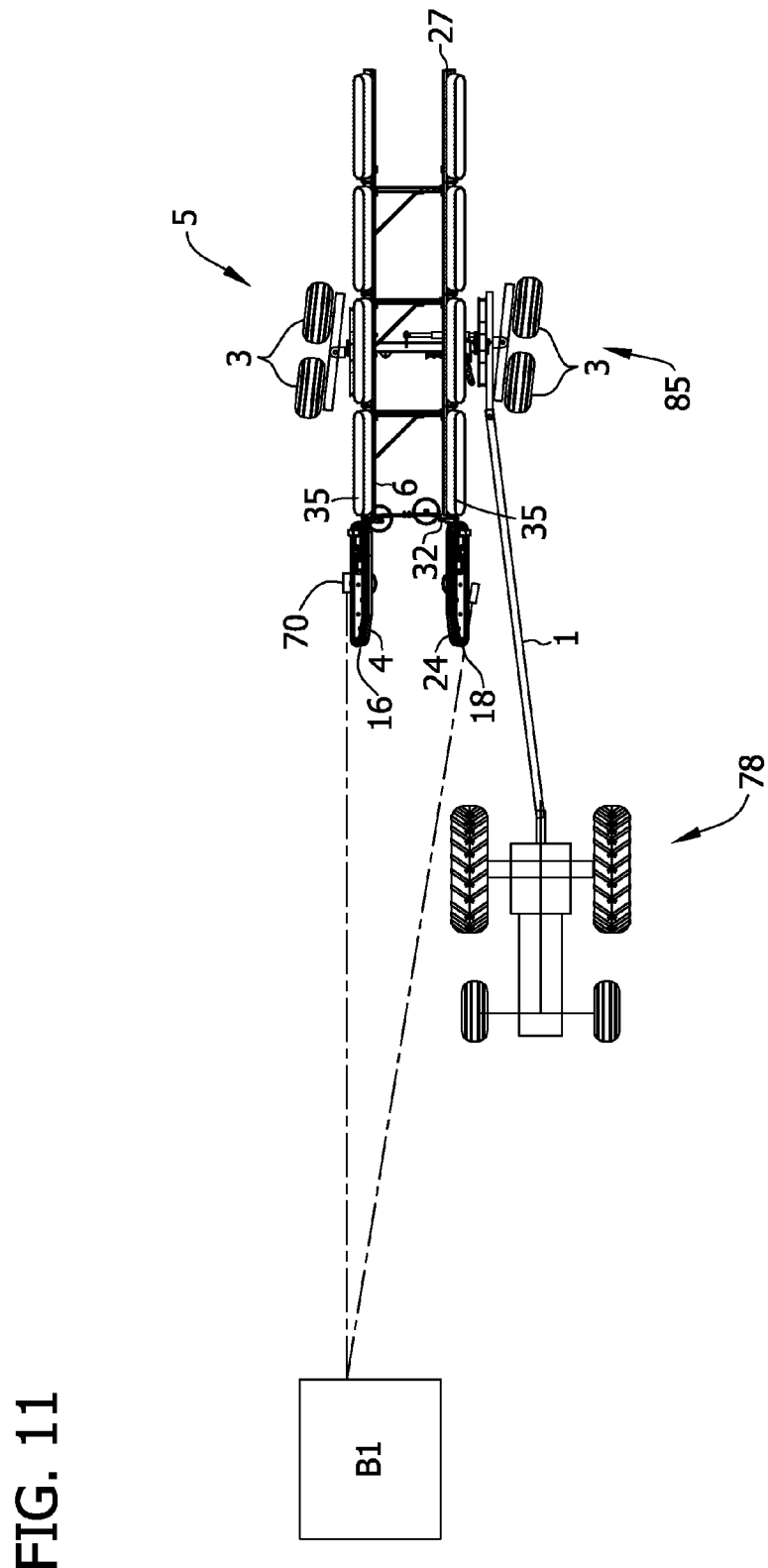
FIG. 11 is a top view of a pulling vehicle and another embodiment of the apparatus having a steerable axle assembly in the traveling position.
Figure 12:
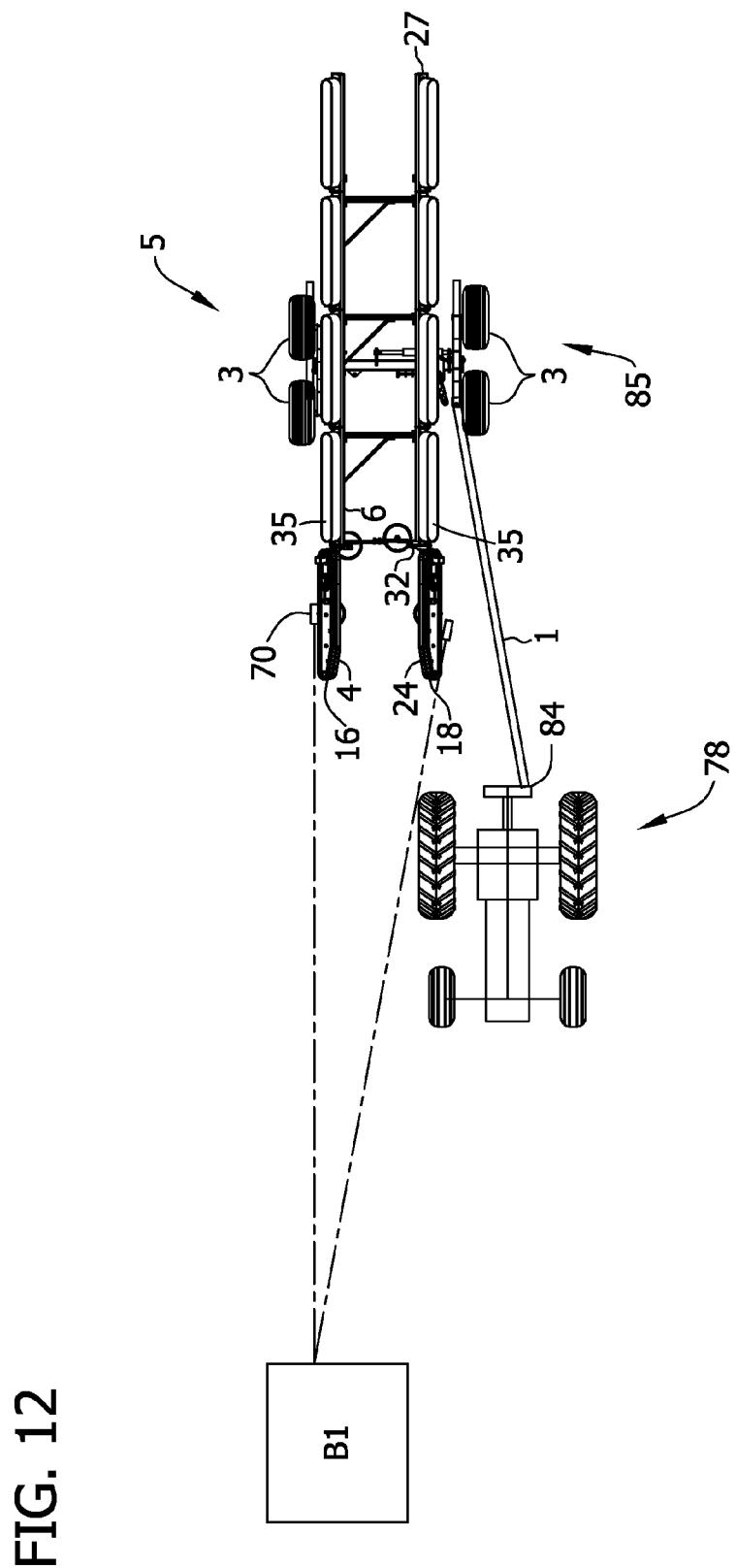
FIG. 12 is a top view of a pulling vehicle and another embodiment of the apparatus having a sliding off-set hitch in the traveling position.
Figure 13:
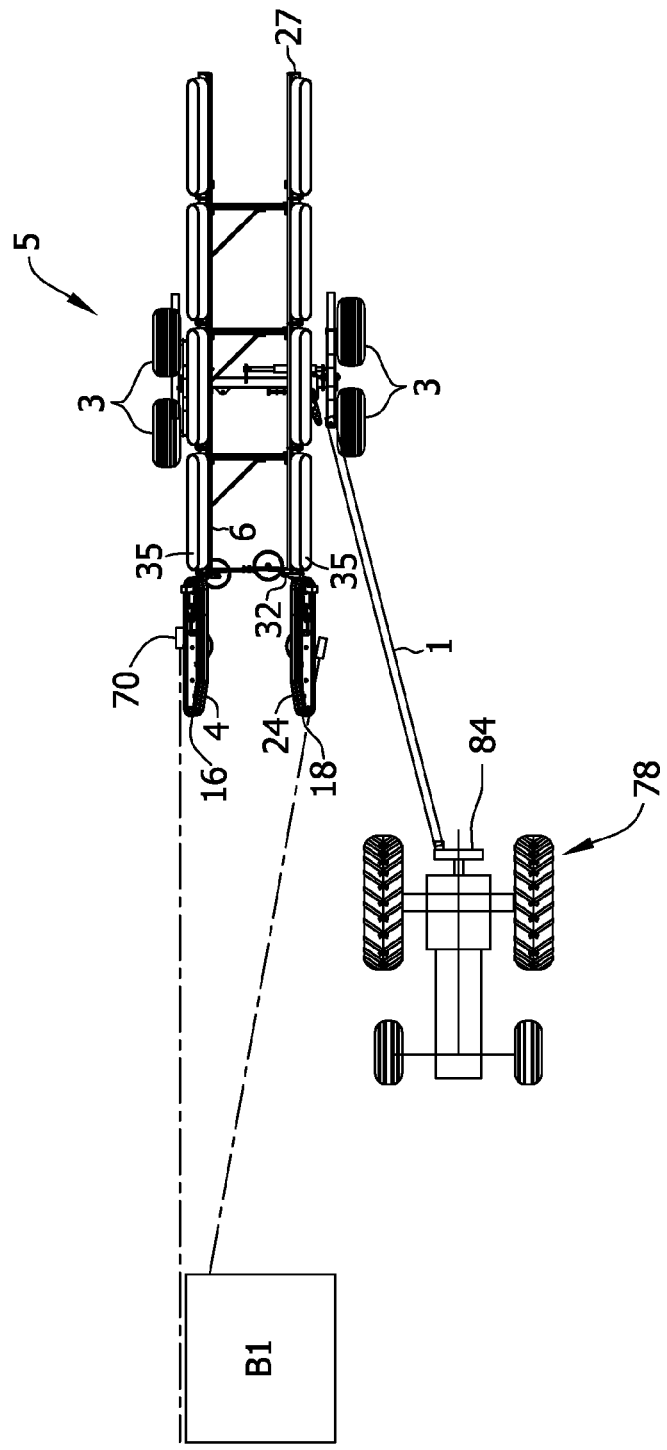
FIG. 13 is a top view of a pulling vehicle and the apparatus of FIG. 12 in the loading position.

The position of the loading assembly 15 and bed 25 relative to the pull vehicle 78 (i.e., whether the apparatus is pulled directly behind the pull vehicle or at an offset position such as when bales are being gathered from the field) may be adjusted by any suitable method or combination of methods including, for example, by manipulating the angle between the tongue 1 and the bed chassis 6 (FIG. 1) by use of hydraulics or by any other suitable method. In other embodiments, the position of the loading assembly 15 and bed 25 relative to the pull vehicle 78 is adjusted by use of a steerable axle assembly 85 (FIG. 11). In other embodiments, the position of the loading assembly 15 and bed 25 relative to the pull vehicle 78 is adjusted by use of a sliding offset hitch 84 as shown in FIGS. 12-13. In FIG. 12 the tongue 1 is attached to the sliding offset hitch 84 at the loading position (i.e., closer to the loading side of the pull vehicle 78) and in FIG. 13 the tongue 1 is attached at the non-loading position of the sliding offset hitch (i.e., opposite the loading position).

The bed conveyors may be constructed from the same basic components used in the loading assembly conveyors, with an endless conveyor belt, an idler roller, a drive roller and supports. The embodiments illustrated herein show an alternative construction for the bed conveyors 35, each including an endless conveyor belt of a slightly different construction than the belts 16 and 18, routed around a drive pulley and an idler pulley. In some embodiments the drive pulley is positioned at the front or, in other embodiments, at the rear of the conveyor.

The surface characteristics of the conveyors 16, 18 may affect the frictional engagement between the conveyor belt and the bale. The conveyor belts 16, 18 may include a surface that will adequately engage the bale to enhance the capability for the loading assembly to reliably lift the bales while also minimizing potential for damage to the bale and any bale wrapping.

It should be noted that any suitable type of conveyer belts or conveyor systems may be included in the apparatus. For instance, a conveyor belt composed of a carcass of nylon or fiberglass fibers covered by a wide variety of materials including rubber, PVC, thermoplastic polymer or the equivalent may be used. Chain conveyor systems may also be used without departing from the scope of the present disclosure. In this regard, "conveyor belt" as used herein includes any arrangement in which a belt, chain, track or the like is moved around a series of pulleys to cause movement of the belt, chain or track.

Figure 3:
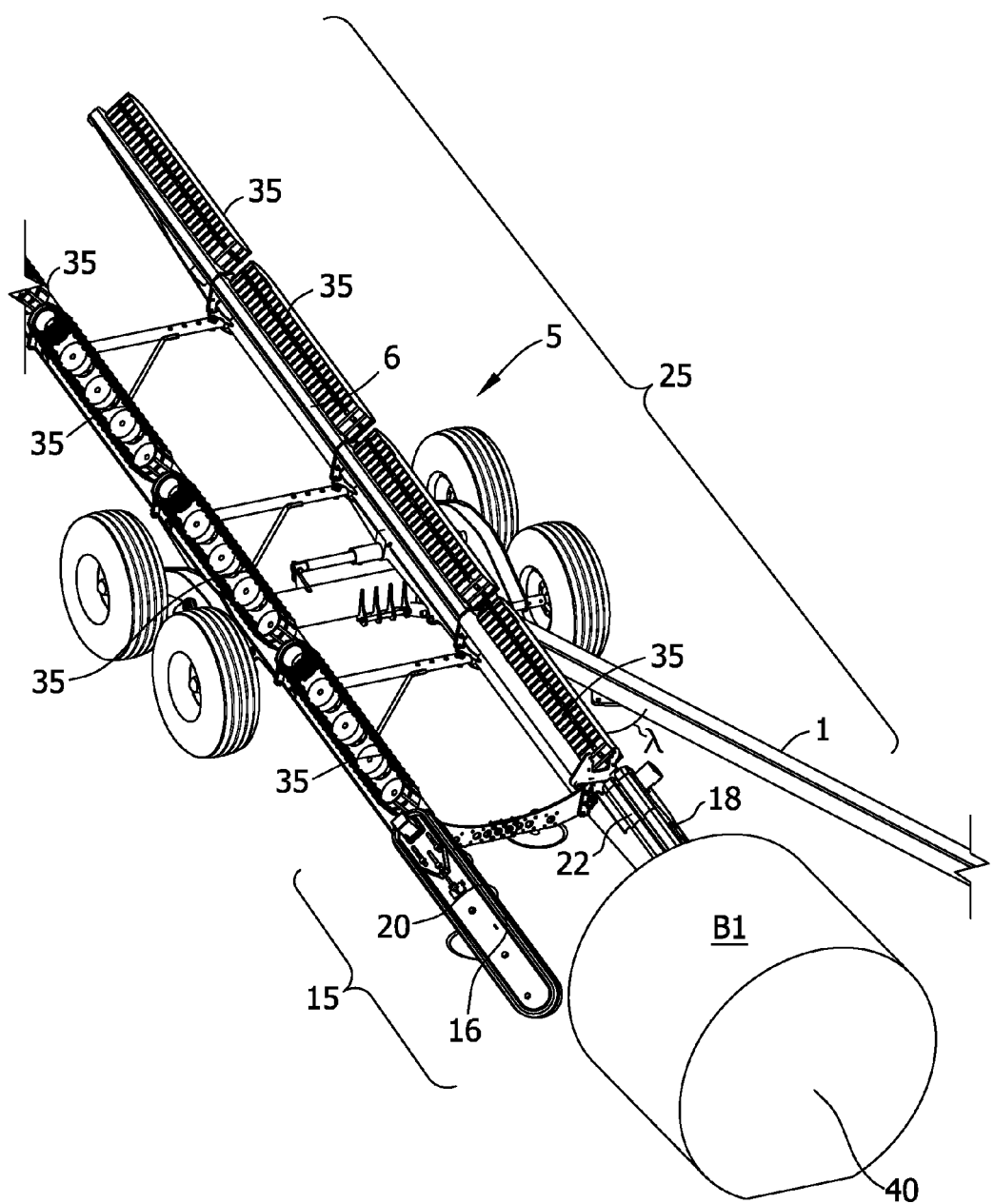
FIG. 3 is a perspective view of the apparatus prior to loading a round bale.

In operation, the apparatus 5 is pulled by the pull vehicle (not shown) toward a bale as shown in FIG. 3. The vehicle may provide the power for running the various conveyors and positioning systems (e.g., by use of hydraulics) or the apparatus 5 may include its own independent power system (e.g., hydraulic system). The apparatus 5 may be described herein with reference to a hydraulic system. It should be noted that the present disclosure should not be limited to a hydraulic system as the principles would apply to other power transfer technologies such as an electrical system.

As shown in FIG. 3, the bale B1 should be oriented such that the ends 40 of the cylindrical bale are perpendicular to the apparatus 5 as the apparatus 5 approaches the bale B1. The chassis 6 and tongue 1 are pivotally connected and are caused to be at an angle $\lambda$ relative to one another such that the loading assembly 15 and bed 25 travel outside of the path of the pull vehicle (not shown) to allow the pull vehicle to travel "outside of" and parallel to the bales B targeted for loading.

The first and second conveyor belts 16, 18 are driven or actuated to cause the belt to move while the apparatus 5 travels toward the first bale B1. As the apparatus 5 approaches the bale B1, the conveyor belts 16, 18 of the arms 4, 24 contact the first bale causing the bale to be lifted and simultaneously moved toward the bed 25. The first bale B1 may be loaded onto the loading assembly 15 without stopping the apparatus 5 such that the apparatus 5 and the vehicle that pulls the apparatus may continually move forward during bale pick-up.

Figure 4:
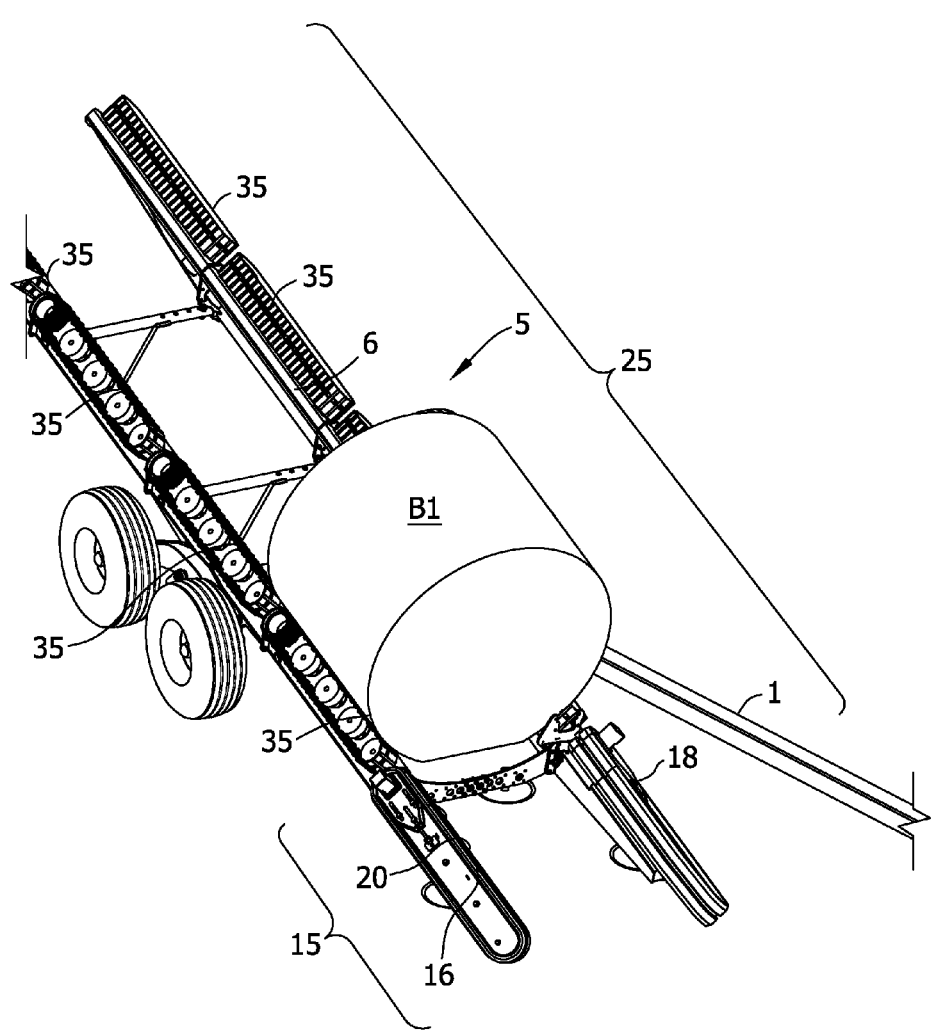
FIG. 4 is a perspective view of the apparatus after the round bale has been loaded onto the bed.

Once the bale B1 is loaded on the loading assembly 15, belt conveyors 35 move to transfer the bale B1 from the loading assembly 15 to the position on the bed 25 as illustrated in FIG. 4. Once loaded onto the bed 25, the bed conveyors 35 are stopped to position the first bale B1 adjacent the end of the loading assembly.

In accordance with the present disclosure, each bale subsequent to the first bale B1 may be loaded until it nears or contacts the previously loaded bale which causes the bale to stop. Once the first bale B1 is loaded, the apparatus 5 is directed to a second bale B2. The conveyor belts 16, 18 of the arms 4, 24 are in motion and move the second bale B2 toward the bed 25 and toward the first bale B1. The loading assembly 15 grasps the second bale B2 and carries the second bale B2 toward the bed 25 until it nears or contacts the first bale B1. Once the second bale B2 nears or contacts the first bale B1, one or more sets of bed conveyors 35 are then actuated to move the first and second bales B1, B2 partially down the bed 25 toward the second end 27. This process is repeated to load additional bales.

Figure 6:
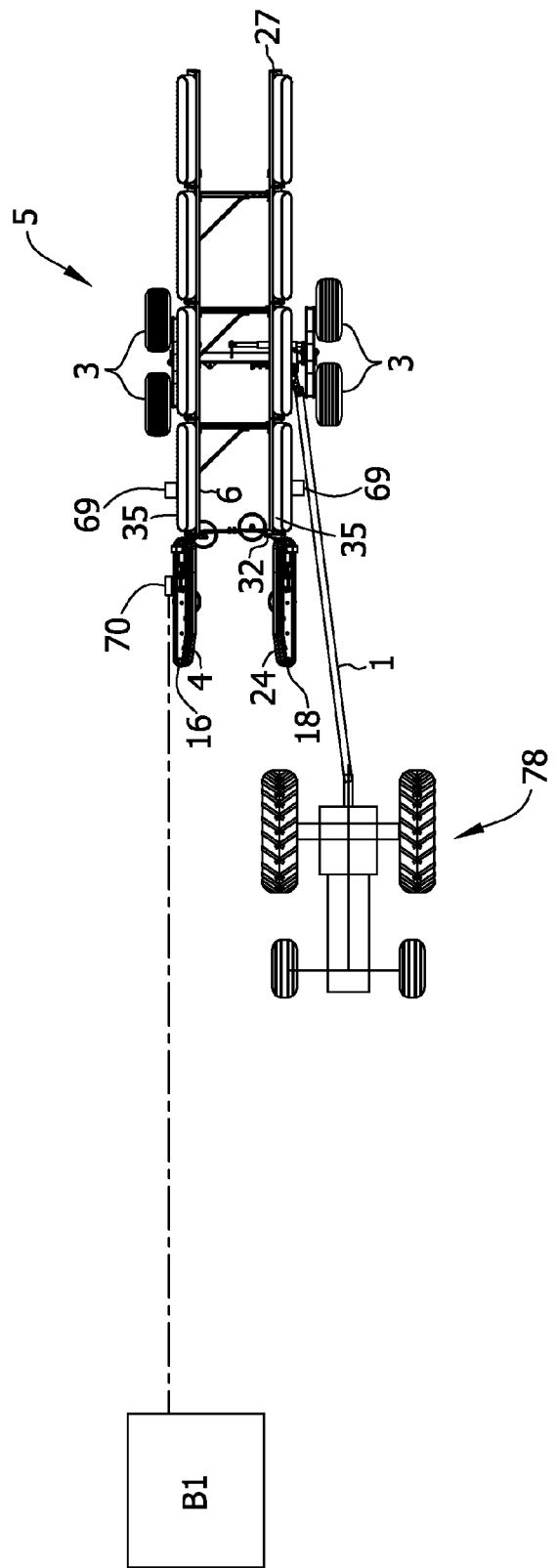
FIG. 6 is a top view of a pulling vehicle and the apparatus in the traveling position.
Figure 8:
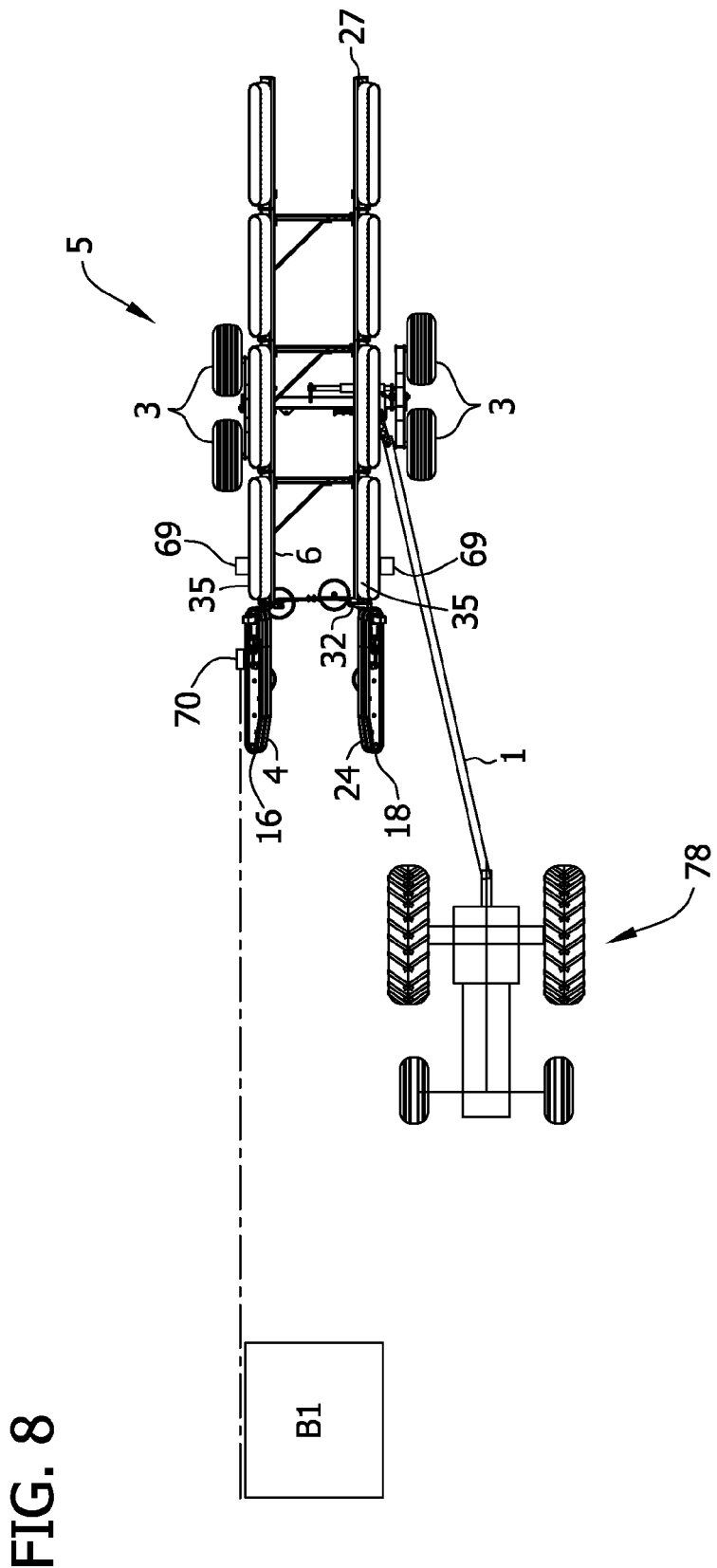
FIG. 8 is a top view of a pulling vehicle and the apparatus in the loading position.

The apparatus 5 includes an alignment control system electronically coupled to a bale sensing system. The alignment control system includes a sensor that is used to sense a bale and/or to sense an edge of the bale to align the apparatus 5 with the bale during bale pick-up. Suitable sensors include lasers, cameras and acoustic sensors such as an ultrasonic sensor. In some embodiments, the alignment control system adjusts the angle $\lambda$ formed between the tongue 1 and the bed chassis 6 (FIG. 6 and FIG. 8). Alternatively or in addition, the alignment control system steers an axle assembly 85 (FIG. 11). Alternatively or in addition, the alignment control system adjusts the position of the apparatus 5 by use of the sliding offset hitch 84 (FIGS. 12-13). In this regard, while the relative position between the apparatus 5 and the pulling vehicle 78 during the bale loading process may be described herein with reference to an adjustable angle $\lambda$ formed between the tongue 1 and the bed chassis 6, these principles should be understood to apply to other methods for adjusting the position of the apparatus including use of the steerable axle assembly 85 (FIG. 11) and/or the sliding offset hitch 84 (FIGS. 12-13).

The apparatus 5 begins in a traveling position relative to the pulling vehicle 78 (FIG. 6) in which the apparatus is partially behind the pulling vehicle. As the apparatus 5 approaches a bale B1, a sensor 70 (which may also be referred to herein as a "forward looking sensor") located on the side of the apparatus opposite where the tongue 1 is connected to the chassis 6 senses the presence of a bale. As shown in FIG. 6, the sensor 70 is mounted to the first arm 4. In this regard, the sensor 70 may be directly mounted to the first arm 4 or mounted indirectly to the first arm 4 by mounting to one or more intermediate parts. In other embodiments, the sensor 70 is directly or indirectly mounted to the chassis 6 which supports the bed conveyors 35.

Figure 7:
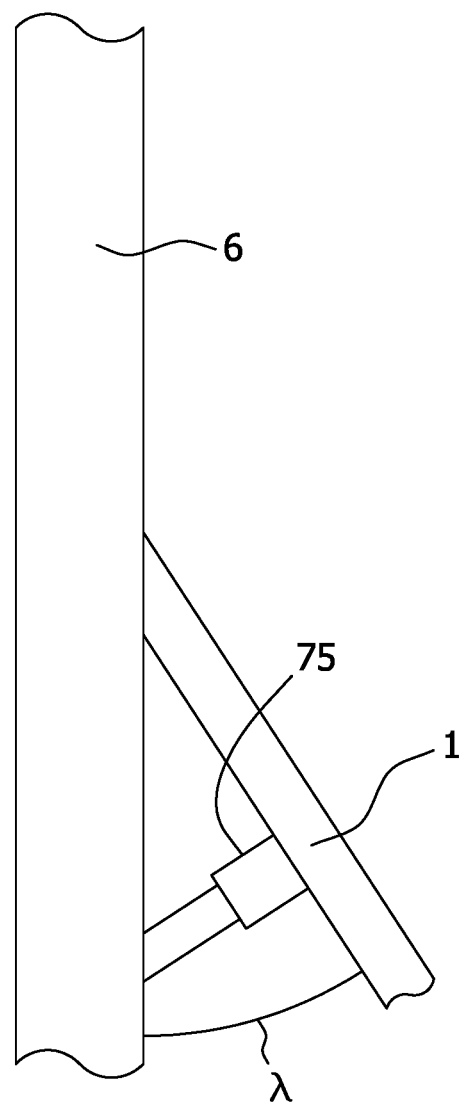
FIG. 7 is a top view of a hydraulic cylinder attached to the chassis and tongue of the apparatus.

The sensor 70 sends a signal to a controller (not shown) and the controller causes a hydraulic system to supply fluid to the cylinder 75 (FIG. 7) between the tongue 1 and chassis 6 of the apparatus to be actuated to increase the angle $\lambda$ to further off-set the apparatus 5 from the pull vehicle 78. The controller continues to increase the off-set until the sensor 70 no longer senses the bale. This change, from sensing a bale to not sensing a bale, occurs when the sensor is aligned with the edge of the bale B1 (i.e., the sensor extends past the far edge of the bale) as shown in FIG. 8. Once the edge of the bale B1 is sensed, the off-set is maintained constant. The pull vehicle passes by the bale B1 while maintaining the apparatus 5 centered with the bale B1 (i.e., with the apparatus at the "loading position" relative to the pull vehicle).

After bale pick-up, the controller actuates the cylinder such that angle $\lambda$ is decreased and the apparatus 5 returns to its traveling position relative to the pulling vehicle 78.

Figure 9:
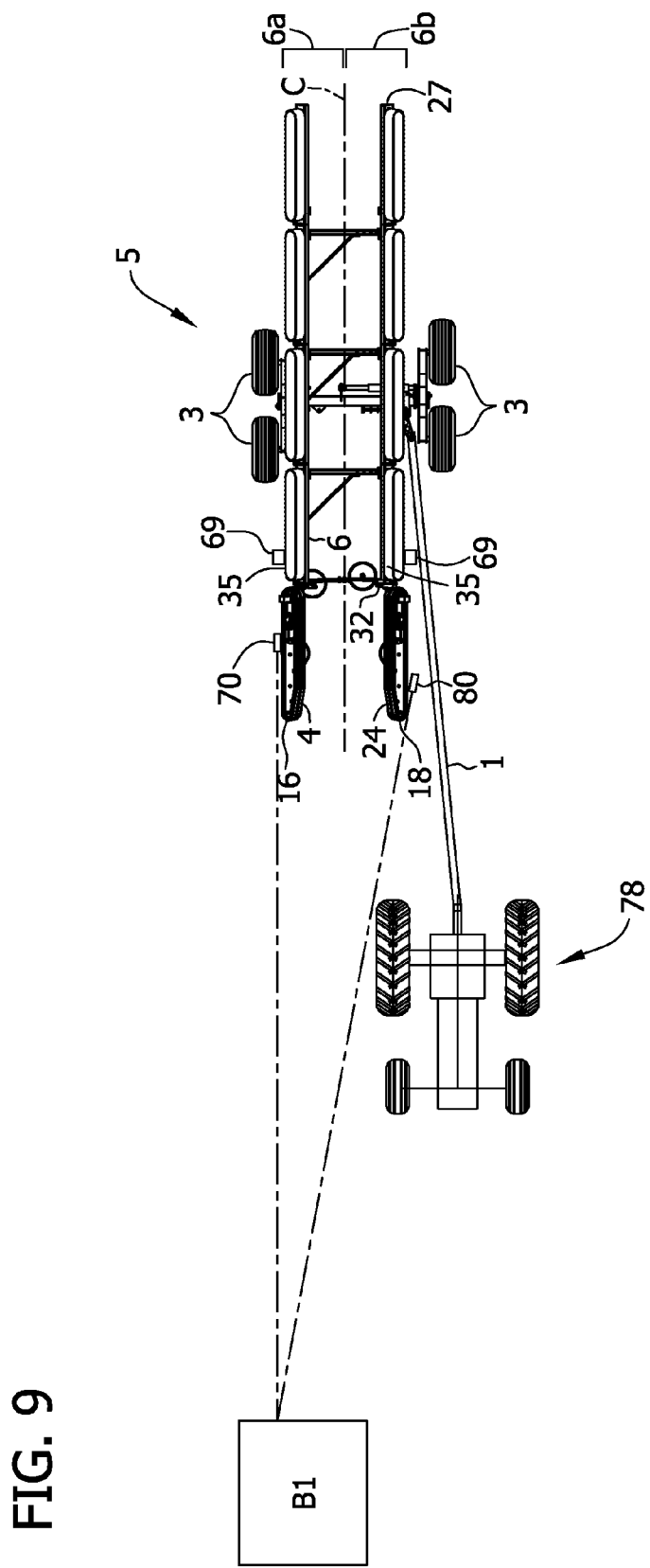
FIG. 9 is a top view of a pulling vehicle and another embodiment of the apparatus in the traveling position.

In some embodiments and as shown in FIG. 9, the apparatus 5 includes a second sensor 80 directly or indirectly mounted to the chassis 6 for sensing a bale. The second sensor 80 may be a laser, camera or an acoustic sensor such as an ultrasonic sensor. The second sensor 80 is offset from the first forward-looking sensor 70. As shown in FIG. 9, the second sensor 80 is mounted on the side opposite the first sensor 70 and angled toward the loading side of the pulling apparatus 78. In this position the sensor 80 is able to sense the presence of an approaching bale during loading.

The chassis 6 of the apparatus 5 has a lengthwise axis C that extends through the center of the apparatus from the first and second arms 4, 24 to the second end 27 of the bed conveyor 35. The center axis C defines a first side 6a of the apparatus that extends furthest from the pulling vehicle 78 during bale loading and a second side 6b of the apparatus that is more near the pulling vehicle during bale loading. As shown in FIG. 9, the first sensor 70 may be mounted to the first side 6a of the apparatus and the second sensor 80 is mounted to the second side 6b of the apparatus. In some embodiments, the second sensor 80 is mounted on the same side as, but offset from, the first sensor 70.

The controller (not shown) causes a hydraulic system to supply pressurized fluid to the cylinder 75 (FIG. 7) to actuate the cylinder to move the apparatus 5 from the traveling position to the loading position relative to the pull vehicle 78 (i.e., to increase the angle $\lambda$ between the tongue and the chassis) when both sensors 70, 80 concurrently sense the bale B1. By not actuating the cylinder 75 until both sensors 70, 80 sense the bale, the incidence of a bale being sensed when only blown debris or wind is present may be reduced. The first sensor 70 and/or second sensor 80 may be used to sense the edge of the bale B1 (i.e., when the loading position of the apparatus 5 has been reached). In some embodiments, the first sensor 70 is used alone to sense the edge of the bale B1. In some embodiments, the first sensor 70 is used to sense the edge and the second sensor 80 is used to validate or confirm the presence of a bale. In such embodiments, in addition to the second sensor 80, the first sensor 70 may also be used to validate or confirm the presence of a bale as noted above.

The apparatus 5 includes a sensor 69 for detecting the loading of a bale B1 on the apparatus. The loading sensor 69 may be a photoelectric-type (i.e., photo-eye) sensor which includes transmitter and receiver ends. As the bale B1 is loaded on the apparatus 5, the bale B1 passes through the line-of-sight of the sensor 69 which indicates that a bale has been loaded. Upon sensing the loading of the bale B1 and transmitting a signal to the controller, the controller actuates the cylinder 75 (FIG. 7) causing the angle λ between the chassis and tongue to decrease and the apparatus to travel from the loading position (FIG. 8) to the traveling position (FIG. 6).

Figure 5:
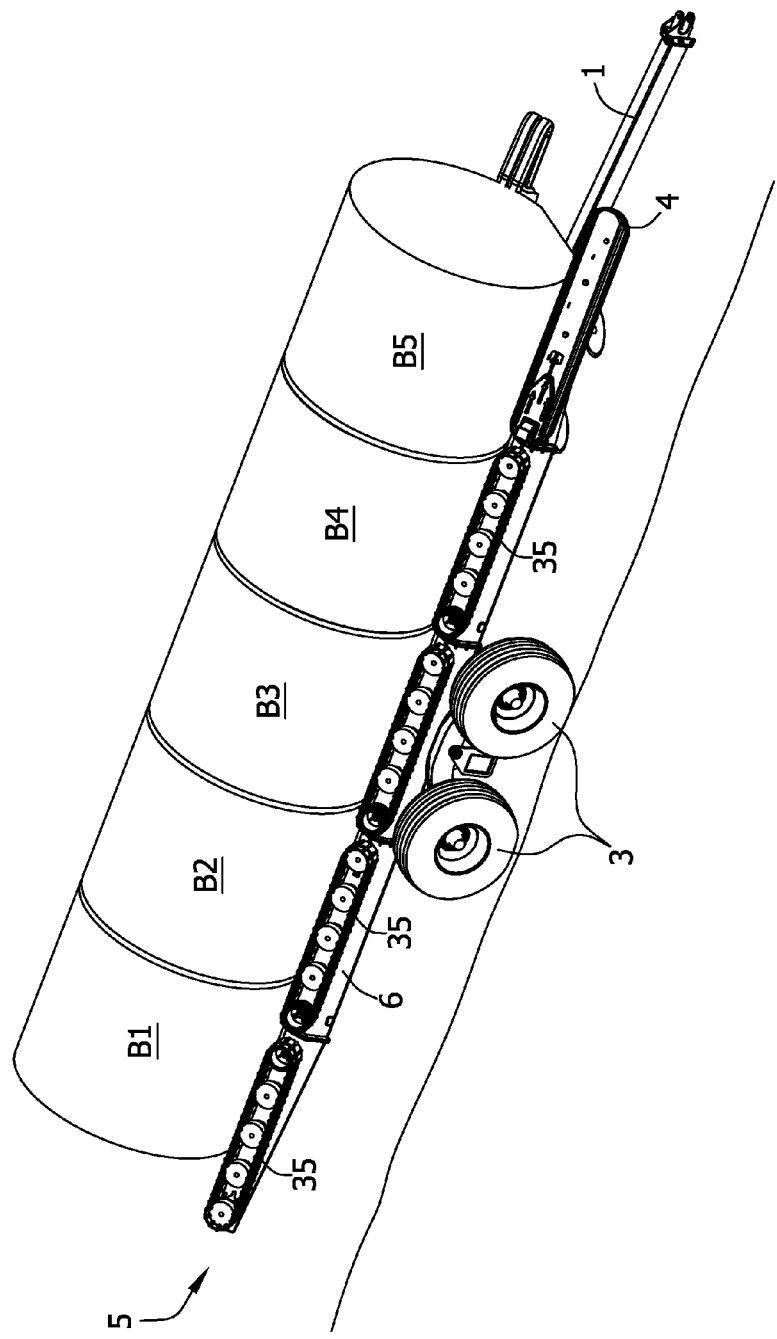
FIG. 5 is a perspective view of the apparatus after being loaded with bales.

Bales may continue to be loaded onto the apparatus 5 until the apparatus becomes fully loaded. Once fully loaded, the apparatus 5 may be adjusted to promote ease of travel to the unloading site. As shown in FIG. 5, the bed chassis 6 of the apparatus 5 may be leveled by use of hydraulic cylinder 17 (FIG. 2) and the relative position between tongue 1 and the bed 15 may be adjusted (e.g., the tongue may be adjusted to be more parallel to the bed).

Figure 2:
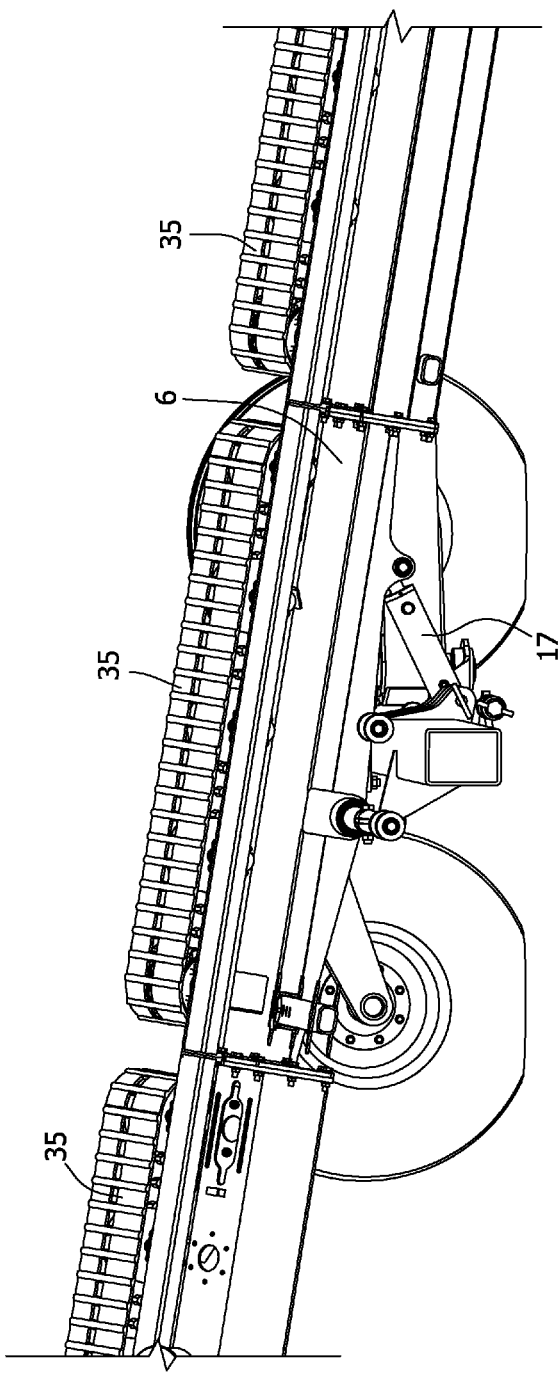
FIG. 2 is a perspective view of a portion of the apparatus showing a hydraulic cylinder for tilting the chassis of the apparatus.

As shown in FIG. 14, once the apparatus 5 is pulled to the desired unloading site for the bales, the bed chassis 6 is tilted by use of the hydraulic cylinder 17 (FIG. 2). The bed conveyors 35 are operated and the apparatus 5 is caused to move forward while the bales are unloaded.

Compared to conventional apparatus for gathering bales, the apparatus 5 described above has several advantages. For example, by including an alignment control system, the apparatus may properly align itself with bales for bale loading without precise alignment control by the user. Further, upon bale loading, the apparatus 5 is able to return to a traveling position without user control in preparation of further bale loading. The user is able to guide the apparatus toward a bale in a general path with the apparatus itself performing lateral adjustment which results in reliable and precise loading of bales.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. An apparatus for gathering bales from a surface, the apparatus comprising:
    a propulsion mechanism for propelling the apparatus, the propulsion mechanism being a dedicated propulsion system or a part of a pull vehicle that tows the vehicle;
    a loading assembly for lifting a bale off the surface and onto the apparatus, the loading assembly comprising:
        a first arm having a first roller;
        a second arm having a second roller, wherein the first and second rollers are capable of rotating during operation to lift a bale from the surface;
    a forward-looking sensor mounted on the apparatus to sense the bale prior to the apparatus contacting the bale, the sensor being a laser, camera or an acoustic sensor; and
    a control system configured to alter a portion of the apparatus to lift a bale off the surface based on output from the forward-looking sensor, the portion being a hydraulic system that positions the arms.

2. The apparatus as set forth in claim 1 wherein the sensor is a laser.

3. The apparatus as set forth in claim 1 further comprising a chassis and a tongue pivotally connected to the chassis for connecting to a pull vehicle, the hydraulic system comprising a hydraulic cylinder connected to the tongue and chassis, the control system controlling the hydraulic cylinder to adjust an angle between the chassis and tongue.

4. The apparatus as set forth in claim 3 in combination with a pull vehicle.

5. The apparatus as set forth in claim 1 wherein the apparatus does not include a pull vehicle.

6. The apparatus as set forth in claim 1 wherein the first and second arms comprise rubber, PVC or a thermoplastic polymer to grasp the bale upon rotation.

7. The apparatus as set forth in claim 1 wherein the first and second arms each comprise a conveyor.

8. The apparatus as set forth in claim 7 wherein the conveyor is formed of rubber, PVC or a thermoplastic polymer.

9. The apparatus as set forth in claim 1 wherein the control system is configured to determine the position of the loading assembly relative to a bale.

10. The apparatus as set forth in claim 1 wherein the forward-looking sensor is configured to sense the edge of the bale in relation to at least a portion of the loading assembly.

11. The apparatus as set forth in claim 1 wherein the control system is configured to alter the hydraulic system to align the arms with a bale.

12. The apparatus as set forth in claim 1 wherein the propulsion mechanism is not altered based on output from the forward looking sensor.

13. The apparatus as set forth in claim 1 wherein the control system is configured to center the bale within the arms.

14. A method for pick-up of a bale resting on a surface by use of an apparatus, the apparatus being the apparatus of claim 1, the method comprising:
    propelling the apparatus toward a bale;
    sensing a bale with the forward-looking sensor prior to the apparatus contacting the bale;
    altering the apparatus for lifting a bale off the surface based on output from the forward-looking sensor; and
    rotating the first and second rollers to load the sensed bale on the apparatus, the first and second arms each contacting a bale to lift the bale onto the apparatus, wherein propelling the apparatus toward a bale is not in response to the forward-looking sensor sensing the bale.

15. The method as set forth in claim 14 wherein the sensor is a laser.

16. The method as set forth claim 14 wherein the apparatus is attached to a pull vehicle for propelling the apparatus toward a bale, the pull vehicle being steered toward the bale by an operator.

17. The method as set forth in claim 14 wherein the apparatus is self-propelled.

18. The method as set forth in claim 14 wherein propelling the apparatus toward a bale comprises an operator steering the apparatus toward a bale.

19. The method as set forth in claim 14 wherein the control system determines the position of the loading assembly relative to a bale, the control system altering the position of the loading assembly based on output from the forward-looking sensor without propelling the whole apparatus toward the bale.

20. The method as set forth in claim 14 wherein the forward-looking sensor senses the edge of the bale.

21. An apparatus for gathering bales from a surface, the apparatus comprising:
a propulsion mechanism for propelling the apparatus, the propulsion mechanism being a dedicated propulsion system or a part of a pull vehicle that tows the vehicle;
a loading assembly for lifting a bale off the surface and onto the apparatus, the loading assembly comprising:
  a first arm having a first roller;
  a second arm having a second roller opposite the first roller, wherein the first and second rollers rotate during operation to lift a bale from the surface;
a forward-looking sensor mounted on the apparatus to sense an edge of the bale prior to the apparatus contacting the bale, the sensor being a laser, camera or an acoustic sensor; and
a control system configured to determine the position of the loading assembly relative to a bale and to alter a portion of the apparatus to lift the bale off the surface based on output from the forward-looking sensor, the portion being a hydraulic system that positions the arms.

22. The apparatus as set forth in claim 21 wherein the control system is configured to alter the hydraulic system to align the arms with a bale.

23. The apparatus as set forth in claim 21 further comprising a chassis and a tongue pivotally connected to the chassis for connecting the apparatus to a pull vehicle, the hydraulic system comprising a hydraulic cylinder connected to the tongue and chassis, the control system controlling the hydraulic cylinder to adjust an angle between the chassis and tongue.

24. The apparatus as set forth in claim 21 wherein the forward-looking sensor senses the edge of the bale in relation to a portion of the loading assembly.

25. The apparatus as set forth in claim 21 wherein the control system is configured to center the bale within the arms.

* * * * *